United States Patent [19]

Köhler et al.

[11] Patent Number: 5,102,929

[45] Date of Patent: Apr. 7, 1992

[54] MIXTURES OF POLYARYLENE SULPHIDES, GLASS FIBRES AND HETEROCYCLIC NITROARYLOXY COMPOUNDS

[75] Inventors: Burkhard Köhler, Krefeld; Walter Uerdingen, Leverkusen; Klaus Kraft, Krefeld; Hans-Detlef Heinz, Krefeld; Wolfgang Wehnert, Krefeld, all of Fed. Rep. of Germany

[73] Assignee: Bayer Aktiengesellschaft, Leverkusen-Bayerwerk, Fed. Rep. of Germany

[21] Appl. No.: 667,341

[22] Filed: Mar. 11, 1991

[30] Foreign Application Priority Data

Mar. 24, 1990 [DE] Fed. Rep. of Germany ....... 4009558

[51] Int. Cl.⁵ ................. C08K 5/3477; C08K 5/3415; C08K 5/3445; C08K 5/3462
[52] U.S. Cl. .................................... 524/101; 524/83; 524/95; 524/99; 524/100
[58] Field of Search .................. 524/100, 101, 83, 95, 524/99; 528/377, 388

[56] References Cited

U.S. PATENT DOCUMENTS 4,548,971 10/1985 Martinovitch et al. ............. 524/101
4,889,788 10/1989 Stahlhofen et al. ................ 430/191
4,990,429 2/1991 Stahlhofen et al. ................ 430/191

FOREIGN PATENT DOCUMENTS 0303108 2/1989 European Pat. Off. .

Primary Examiner—Paul R. Michl
Assistant Examiner—Tae H. Yoon
Attorney, Agent, or Firm—Connolly & Hutz

[57] ABSTRACT

The invention relates to mixtures of polyarylene sulphides, heterocyclic nitryoaryloxy compounds and optionally other additives. The mixtures are distinguished by good mechanical properties.

2 Claims, No Drawings

MIXTURES OF POLYARYLENE SULPHIDES, GLASS FIBRES AND HETEROCYCLIC NITROARYLOXY COMPOUNDS

This invention relates to mixtures of polyarylene sulphides, heterocyclic nitroaryloxy compounds and optionally other additives. The mixtures are distinguished by their good mechanical properties.

Polyarylene sulphides (PAS) are known (e.g. U.S. Pat. No. 3,354,129, EP-A 171 021). They are inert, highly temperature resistant thermoplasts which are capable of taking up a high proportion of fillers such as glass fibres and/or other inorganic fillers. These polymers, in particular polyphenylene sulphide (PPS), are being increasingly used in fields which have hitherto been the preserve of duroplasts.

PPS has mechanical properties which are unsatisfactory for certain applications, e.g. in the field of injection moulding. In particular, the flexural and tensile strength, the edge fibre elongation, the impact strength and the moduli of elasticity are frequently insufficient for practical purposes. It has therefore been found advantageous to improve PPS in these properties, e.g. by mixing the PPS with other thermoplastis, e.g. with polycarbonates (e.g. JP-A 51-59952, EP-A 104 543 and U.S. Pat. No. 4,021,596).

The profile of properties of such mixtures is, however, not always quite satisfactory for certain fields of application.

It is known that PAS may be modified in its properties by mixing it with maleimides. In most cases, this results in branching of PPS since the modification may be carried out by, for example, reacting PPS with maleimides under oxidizing conditions (JP-A 021 876) or by reacting PPS with compounds containing at least three maleimide groups and a triazine ring (e.g. JP-A 202 162, EP-A 105 639).

It would therefore be desirable to provide additives which combine the oxidizing and cross-linking properties in one molecule and improve the mechanical properties of PAS mixtures.

It has now been found that nitroaryl oxytriazines improve the mechanical properties of PAS, particularly of PPS.

The present invention therefore relates to mixtures of

A) from 99.9 to 15% by weight, preferably from 90–20% by weight, of polyarylene sulphides, preferably PPS, B) from 0.1–10% by weight, preferably from 0.5–5% by weight, of a heterocyclic nitroaryloxy compound prepared in known manner by the reaction of a) heterocyclic compounds corresponding to formulae (I)–(VIII)

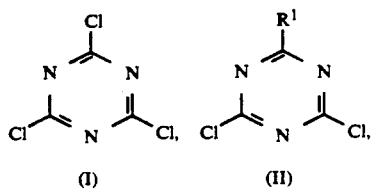

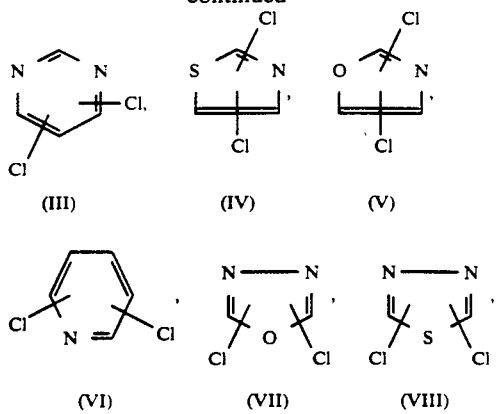

preferably formula I, wherein $R^1$ stands for a $C_6$–$C_{24}$-aryl, a $C_6$–$C_{24}$-aryloxy, a $C_1$–$C_6$-alkyl- or a $C_1$–$C_6$-alkoxy group with b) nitroaryloxy compounds corresponding to formula (IX)

$$(NO_2)_x\text{—Ar—}(OH)_y \qquad (IX)$$

wherein Ar denotes a $C_6$–$C_{24}$-aromatic group, preferably a $C_6$-aromatic group, and x and y stand for 1 or 2, preferably 1, under the condition that the ratio of Cl to OH groups in the educt mixtures is from 0.9:1 to 1.1:1 and that the resulting product or product mixture contains on average at least two nitroaryloxy units per molecule, the hydrogen chloride formed in the reaction being preferably absorbed by bases, and C) from 0–84.9% by weight, preferably from 9.9–79.9% by weight, of mineral filler and reinforcing materials which are preferably sized with aminosilane coupling agents.

The additives B) according to the invention may be prepared by, for example, methods analogous to those of Berichte 18, 765.

The following are examples of additives B): 2,4,6-Tris-(4-nitrophenoxy)-1,3,5-triazine and 2,4,6-tris-(2-nitrophenoxy)-1,3,5-triazine.

Examples of suitable mineral fillers and additives include mica, microtalc, talc, quartz powder, metal oxides and sulphides such as $TiO_2$, ZnO and ZnS, graphite, carbon black, fibres, e.g. of quartz and carbon, carbonates such as $MgCO_3$ or $CaCO_3$, sulphates such as $CaSO_4$ or $BaSO_4$, glass fibres, glass beads, etc.

EXAMPLES

The mixtures according to the invention were prepared in a double shaft extruder ZSK 32 of Werner and Pfleiderer at 320° C., The PPS used had a fusion viscosity of 59 PA.s (306° C.), shear stress=1,000 s$^{-1}$ and was prepared according to EP-a 171 021.

The glass fibres were sized staple glass fibres Bayer CS 7916 (®) used in a quantity of 40% by weight together with 0.5% by weight of microtalc. The coupling agent of the glass fibres is an aminosilane.

The mixtures were granulated and extruded to form test rods (e.g. measuring 80×10×4 mm). These were tested for flexural strength, edge fibre elongation, modulus in flexure and impact strength $a_n$ (reversed notched ISO 180).

COMPARISON EXAMPLE 1

59.5% of PPS were mixed with the fillers.

EXAMPLE 1

59% of PPS and 1% of tris-(4-nitro-phenoxy)-1,3,5-triazine were mixed with the fillers.

| Example | Flexural Strength MPa | Edge fibre Elongation % | E-Modulus MPa | Izod impact strength kJ/m² |
|---|---|---|---|---|
| Comparison 1 | 249 | 1.86 | 13 060 | 28.5 |
| 1 | 311 | 2.39 | 13 402 | 44.1 |

We claim:
1. Mixtures of
A) from 99.9 to 15% by weight of polyarylene sulphide,
B) from 0.1-10% by weight of a heterocyclic nitroaryloxy compound prepared in known manner by the reaction of
 a) heterocyclic compounds corresponding to formulae (I) to (VIII)

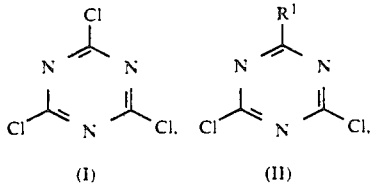

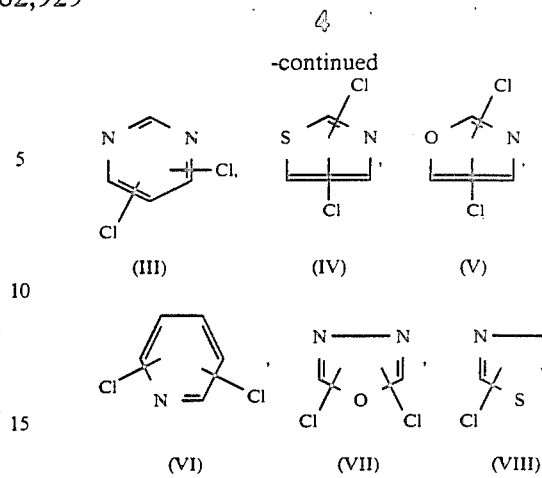

wherein $R^1$ represents an aryl, aryloxy, alkyl or alkoxy group with
b) bisphenols or nitroaryloxy compounds corresponding to formula (IX)

$$(NO_2)_x-Ar-(OH)_y \qquad (IX)$$

wherein Ar denotes an aromatic group, and x and y each represents 1 or 2, under the condition that the ratio of $C_2$ to OH groups in the reaction mixture is from 0.9:1 to 1.1:1 and that the resulting product or product mixture contains on average at least two nitroaryloxy units per molecule, and
C) from 0-84.9% by weight of mineral fillers and reinforcing materials.
2. Molded articles comprising the mixture claimed in claim 1.